United States Patent [19]

Ukaji et al.

[11] 3,925,492

[45] Dec. 9, 1975

[54] PROCESS FOR PREPARING POLYCARBONMONOFLUORIDE

[75] Inventors: Rokuo Ukaji, Ibaraki; Tutomu Kamihigoshi, Takatsuki; Kenji Mikami; Shoji Takaki, both of Settsu, all of Japan

[73] Assignee: Daikin Kogyo Co., Ltd., Osaka, Japan

[22] Filed: May 30, 1974

[21] Appl. No.: 474,804

[30] Foreign Application Priority Data

May 30, 1973 Japan............................ 48-61076

[52] U.S. Cl. ............................................. 260/653.9
[51] Int. Cl.² ............................................. C07C 17/00
[58] Field of Search............ 260/653, 653.8, 653.9; 423/439, 489

[56] References Cited

UNITED STATES PATENTS

| | | | |
|---|---|---|---|
| 2,774,797 | 12/1956 | Mantell et al. | 260/653.9 |
| 2,993,567 | 7/1961 | Schachner | 260/653.9 |

*Primary Examiner*—D. Horwitz
*Attorney, Agent, or Firm*—Armstrong, Nikaido & Wegner

[57] ABSTRACT

In a process for preparing polycarbonmonofluoride by reacting carbon materials with fluorine gas, air is employed as a diluent of fluorine gas. The employment of air as a diluent of fluorine gas can reduce the production cost of polycarbonmonofluoride, particularly in mass-production thereof and give polycarbonmonofluoride in a good yield, the total amount of by-products being reduced.

6 Claims, No Drawings

PROCESS FOR PREPARING POLYCARBONMONOFLUORIDE

BACKGROUND OF THE INVENTION

The present invention relates to a novel process for preparing polycarbonmonofluoride, particularly to an improved process for preparing polycarbonmonofluoride which is characterized by employing air as a diluent of fluorine gas.

Recently, polycarbonmonofluoride has become the object of public attention as a new industrial material and has been applied to various used, for instance, as an active material for primary cells of high energy density, as solid lubricant to be incorporated in liquid lubricants, greases and coating compositions, as a fluorinating agent, and the like. Therefore, the demand for polycarbonmonofluoride has increased and there has been desired the mass-production of polycarbonmonofluoride.

Polycarbonmonofluoride is prepared by reacting carbon materials with fluorine gas, for instance, as described by O. Ruff and O. Bretschneider, in Z. anorg. u. allg. Chem. 217, 1 (1934) and W. Rudorff and O. Rudorff, in Z. anorg. u. allg. Chem. 253,281 (1947). For the reason of the high reactivity of fluorine gas, in a conventional process, fluorine gas employed was usually diluted with an inert gas such as nitrogen, helium, argon, neon and carbon dioxide, as described in U.S. Pat. No. 3,397,087, Column 3, lines 6 to 9 and U.S. Pat. No. 2,786,874, Column 3, lines 10 to 22.

However, the employment of a great amount of such inert gas resulted in a high production cost of polycarbonmonofluoride. Accordingly, such a conventional process was not suitable as a process for the mass-production of polycarbonmonofluoride.

Further, prior to the present invention it has been generally considered that the presence of air in the reaction system consisting of carbon material and fluorine gas was not preferable since oxygen in air induced side reactions and, in soms cases, degraration or combustion, which resulted in a low yield of polycarbonmonofluoride. For instance, it was known to adopt the means such as eliminating the air from the reaction system prior to the beginning of the reaction and then the reaction was carried out in the reaction system free from oxygen as described in U.S. Pat. No. 2,933,567, Column 2, lines 18 to 22.

OBJECTS OF THE INVENTION

An object of the present invention is to provide a process for preparing polycarbonmonofluoride without employing such expensive inert gases as employed in conventional processes.

Another object of the invention is to provide a process for preparing polycarbonmonofluoride in which polycarbonmonofluoride is obtained in a high yield not less than that obtained in conventional processes, the formation of by-products being not increased nevertheless the employment of air.

Further object of the invention is to provide a process suitable for the mass-production of polycarbonmonofluoride.

These and other objects of the invention will become apparent from the description hereinafter.

DETAILED DESCRIPTION OF THE INVENTION

It has now been found that air of which presence has not been permitted in the reaction system in the prior arts can be employed as a diluent of fluorine gas and the above-mentioned objects are readily accomplished by reacting carbon materials with fluorine gas in the presence of air.

According to the present invention employing air as a diluent of fluorine gas at a temperature from 250° to 600°C. and under a partial pressure of fluorine gas from 0.3 to 0.01, by-products such as $COF_2$ and $CO_2$ being not formed in conventional process employing inert gases such as nitrogen are formed due to oxygen in air but the amounts of by-products such as perfluorocarbons, for instance, $CF_4$, which are also formed in conventional process employing inert gases, are reduced reversely. As a result, the total amount of by-products ($COF_2$, $CO_2$ and perfluorocarbons) in the instant process is more reduced than the total amount of by-products (perfluorocarbons) in conventional process employing inert gases.

The carbon material employed in the practice of the instant process is not critical and may be either amorphous or crystalline. Examples of carbon materials include amorphous carbons such as carbon black, petroleum coke, petroleum pitch coke and charcoal, and crystalline carbons such as natural graphite and artificial graphite. Such carbon materials can be employed in various forms such as powders, blocks, spheres, bars and fibers.

Fluorine gas employed in the present invention is prepared by the electrolysis of a solution of KF.2HF electrolyte. The fluorine gas may be employed as it is but usually hydrogen fluoride therein is removed by a conventional manner. The fluorine gas charged in a bomb which is commercially available can be also employed.

Water vapour in air does not hinder the reaction of the instant process. However, taking into account the influences of the water vapour on material of reactor, it is preferable to employ air free from water vapour.

The process of the present invention carried out by contacting a carbon material with a gas mixture consisting of fluorine gas and air, which are usually mixed prior to contact with the carbon material. In that case, a ratio of fluorine gas and air in the gas mixture is not critical and may vary appropriately. Generally, however, a partial pressure of fluorine gas in the gas mixture is from 0.3 to 0.01, preferably from 0.2 to 0.1, since the reaction proceeds at a proper reaction rate, suppresses the formation of by-products and gives polycarbonmonofluoride in a high yield. In case the partial pressure of fluorine gas is more than 0.3, it is much difficult to eliminate the reaction heat since the reaction rate is too large, and the amounts of by-products such as $COF_2$ and perfluorocarbons increase extremely.

The reaction is carried out, preferably, at a temperature in the range of from 250° to 600°C. More preferable range of reaction temperatures is from 300° to 500°C. In case the reaction temperature is less than 250°C., the reaction rate is too small and in case the reaction temperature is more than 600°C., the reaction rate is too large so that the amounts of by-products such as $COF_2$ and perfluorocarbons increase greatly. As a result, in these cases, the yield of polycarbonmonofluoride is reduced extremely. Generally, however, with respect to the amorphous carbon, reaction temperature is preferably in a range from 300° to 400°C. and with respect to the crystalline carbon, reaction temperature is preferably in a range from 400° to 500°C.

In the preferred embodiment of the instant process, the combination of a reaction temperature from 250° to 600°C. and a partial pressure of fluorine gas from 0.3 to 0.01 is employed since polycarbonmonofluoride is obtained in higher yield, the total amount of by-products being more reduced.

As the reaction pressure of the instant process, generally, normal pressures are employed. In case of need, either elevated pressures or reduced pressures may be employed.

The reactor employed in the present invention is not limited to a particular one so long as it can be employed for the reaction of solid and gas at an elevated temperature. Preferred examples of the reactors include fluidized bed-type reactors, rotary kiln-type reactors and tray tower-type reactors. As a kind of material of reactors, Monel metal, nickel or copper is employed in consideration of the corrosion by flourine gas.

The process of the present invention is also effectively applicable to the fluorination of a part of carbon material, especially, only the neighborhood of the surface thereof.

The process of the present invention, which is characterized by employing air as a diluent of fluorine gas instead of such inert gases, for instance, nitrogen, as employed in conventional processes, is excellent for the mass-productioh of polycarbonmonofluoride and extremely preferable for an industrial purpose.

The process of the present invention is more particularly described and explained by means of the following illustrative Examples.

EXAMPLES 1 TO 12 AND COMPARATIVE EXAMPLES 1 TO 3

On a dish made of Monel metal which is located approximately in the center of a cylindrical reactor was placed 6.0 g. of a carbon material so that the thickness of carbon layer becomes uniform.

The inner temperature of the reactor was regulated to a desired temperature by means of an automatic temperature controller.

A gas mixture of fluorine gas and air (in Comparative Examples 1 to 3, nitrogen gas) in which each gas was mixed so as to possess a desired partial pressure was introduced into the reactor through the inlet of gas, located in the lower part thereof and allowed to contact with the carbon material for a desired period. The fluorine gas was employed after hydrogen fluoride was removed by trichlene-dry ice trap and NaF tower.

After the completion of reaction, the yield of the solid product obtained is determined. Further the content of fluorine in the solid product was determined by elementary analysis and the recovery rate of carbon was calculated from the following equation.

$$\text{Recovery rate of carbon (\% by weight)} = \frac{\left[\text{Yield of solid product (g.)}\right] \times \left[1 - \frac{\text{Content of fluorine in solid product (\% by weight)}}{100}\right]}{\text{Amount of carbon material supplied (g.)}} \times 100$$

On the other hand, the residual gas of the reaction was analyzed quantitatively by gas chromatography and the proportion of each component contained in the residual gas was calculated from the following equation.

$$\text{Proportion of each component in the residual gas (\% by weight)} = \frac{\text{Amount of carbon contained in each component (g.)}}{\text{Amount of carbon material supplied (g.)}} \times 100$$

The results are shown in Table 1.

Table 1

| Example No. | Reaction condition Partial pressure | | | Temp. (°C.) | Reaction time (mins.) |
|---|---|---|---|---|---|
| | Fluorine gas | Air | Nitrogen gas | | |
| 1 | 0.02 | 0.98 | — | 350 | 400 |
| 2 | 0.08 | 0.92 | — | 350 | 150 |
| 3 | 0.12 | 0.88 | — | 350 | 100 |
| 4 | 0.15 | 0.85 | — | 350 | 90 |
| 5 | 0.15 | 0.85 | — | 300 | 90 |
| Comparative Example 1 | 0.15 | — | 0.85 | 350 | 90 |
| 6 | 0.18 | 0.82 | — | 350 | 80 |
| 7 | 0.25 | 0.75 | — | 350 | 60 |
| Comparative Example 2 | 0.25 | — | 0.75 | 350 | 60 |
| 8 | 0.15 | 0.85 | — | 450 | 90 |
| 9 | 0.15 | 0.85 | — | 500 | 90 |
| Comparative Example 3 | 0.15 | — | 0.85 | 500 | 90 |
| 10 | 0.35 | 0.65 | — | 350 | 40 |
| 11 | 0.40 | 0.60 | — | 350 | 40 |
| 12 | 0.15 | 0.85 | — | 650 | 90 |

| Example No. | Carbon material (Note 1) | Yield of solid product (g.) | Content of fluorine in solid product (% by weight) | Recovery rate of carbon (% by weight) |
|---|---|---|---|---|
| 1 | A | 15.3 | 62.0 | 95 |
| 2 | A | 14.5 | 62.0 | 92 |
| 3 | A | 14.0 | 61.5 | 90 |
| 4 | A | 14.2 | 62.0 | 90 |
| 5 | A | 12.8 | 58.0 | 90 |
| Comparative Example 1 | A | 13.5 | 61.6 | 87 |
| 6 | A | 13.4 | 62.0 | 85 |
| 7 | A | 12.7 | 62.2 | 80 |
| Comparative Example 2 | A | 12.1 | 62.1 | 77 |
| 8 | B | 12.4 | 59.0 | 85 |
| 9 | B | 14.0 | 60.0 | 80 |
| Comparative Example 3 | B | 12.1 | 61.2 | 78 |
| 10 | A | 9.5 | 62.1 | 60 |
| 11 | A | 7.0 | 62.0 | 50 |
| 12 | B | 3.0 | 60.7 | 20 |

| Example No. | Proportion of each component in the risidual gas (% by weight) | | | |
|---|---|---|---|---|
| | $COF_2$ | $CO_2$ | Perfluoro carbon of $C_1$ to $C_8$ | Others (Note 2) |
| 1 | 0.5 | 0.4 | 1.1 | 3.0 |
| 2 | 2.0 | 1.0 | 2.0 | 3.0 |
| 3 | 2.0 | 0.8 | 3.2 | 4.0 |
| 4 | 2.5 | 1.5 | 4.0 | 2.0 |
| 5 | 2.6 | 1.2 | 4.2 | 2.0 |
| Comparative Example 1 | 0 | 0 | 9.0 | 4.0 |
| 6 | 3.0 | 1.9 | 5.1 | 5.0 |

Table 1-continued

| Example No. | Reaction condition Partial pressure | | | Temp. (°C.) | Reaction time (mins.) |
|---|---|---|---|---|---|
| | Fluorine gas | Air | Nitrogen gas | | |
| 7 | 4.0 | 2.0 | 10.0 | | 4.0 |
| Comparative Example 2 | 0 | 0 | 15.0 | | 8.0 |
| 8 | 2.5 | 1.5 | 6.0 | | 5.0 |
| 9 | 3.0 | 1.5 | 10.5 | | 5.0 |
| Comparative Example 3 | 0 | 0 | 15.0 | | 9.0 |
| 10 | 6.0 | 4.0 | 20.0 | | 10.0 |
| 11 | 10.5 | 7.5 | 25.0 | | 7.0 |
| 12 | 14.0 | 6.6 | 44.4 | | 15.0 |

Note 1: A is an amorhous carbon having a particle size less than 43 μ. B is a crystalline carbon having a particle size less than 38 μ.
Note 2: Others are mainly consisted of perfluorocarbons of more than 9 carbon atoms.

Data of Table 1 show that, according to the instant process employing air as a diluent gas, by-products such as $COF_2$ and $CO_2$ being not formed in Comparative Examples 1 to 3 employing nitrogen gas are formed but the amounts of by-products such as perfluorocarbons being also formed in Comparative Examples 1 to 3 employing nitrogen gas perfluorocarbons, and by proper choice of reaction temperature and partial pressure of fluorine gas, the total amount of the by-products is reduced to give polycarbonmonofluoride in a high yield in comparison with the conventional process.

What we claim is:

1. In the process for preparing polycarbonmonofluoride by the reaction of carbon materials with fluorine gas, the improvement which comprises employing air as a diluent of said fluorine gas, said carbon materials being selected from the group consisting of carbon black petroleum coke, petroleum pitch coke charcoal, natural graphite and artificial graphite and the reaction being carried out at a temperature in the range from 250°C to 600°C.

2. The process of claim 1, wherein said reaction temperature is from 300° to 500°C.

3. The process of claim 1, wherein said reaction is carried out under a partial pressure of said fluorine gas from 0.3 to 0.01.

4. The process of claim 3, wherein said partial pressure is from 0.2 to 0.1.

5. The process of claim 1, wherein said air is free from water vapour.

6. The process of claim 1, wherein said reaction is carried out in a reactor selected from the group consisting of fluidized bed-type reactor, rotary kiln-type reactor and tray tower-type reactor.

* * * * *